C. E. DERR.
GEAR CUTTING MACHINE.
APPLICATION FILED FEB. 11, 1913.
1,209,682.
Patented Dec. 26, 1916.
4 SHEETS—SHEET 3.
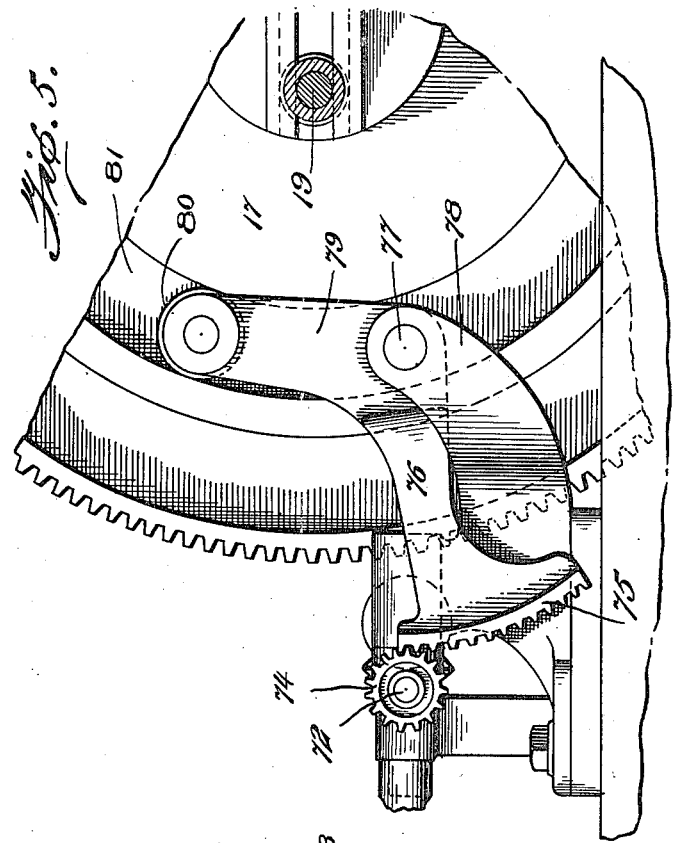
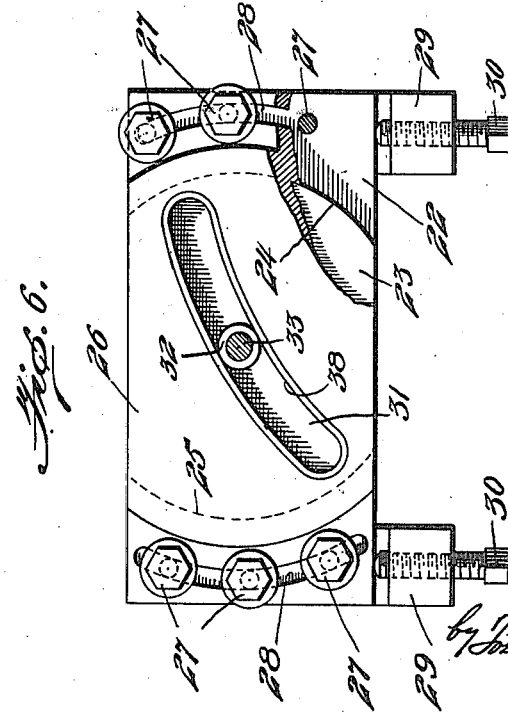

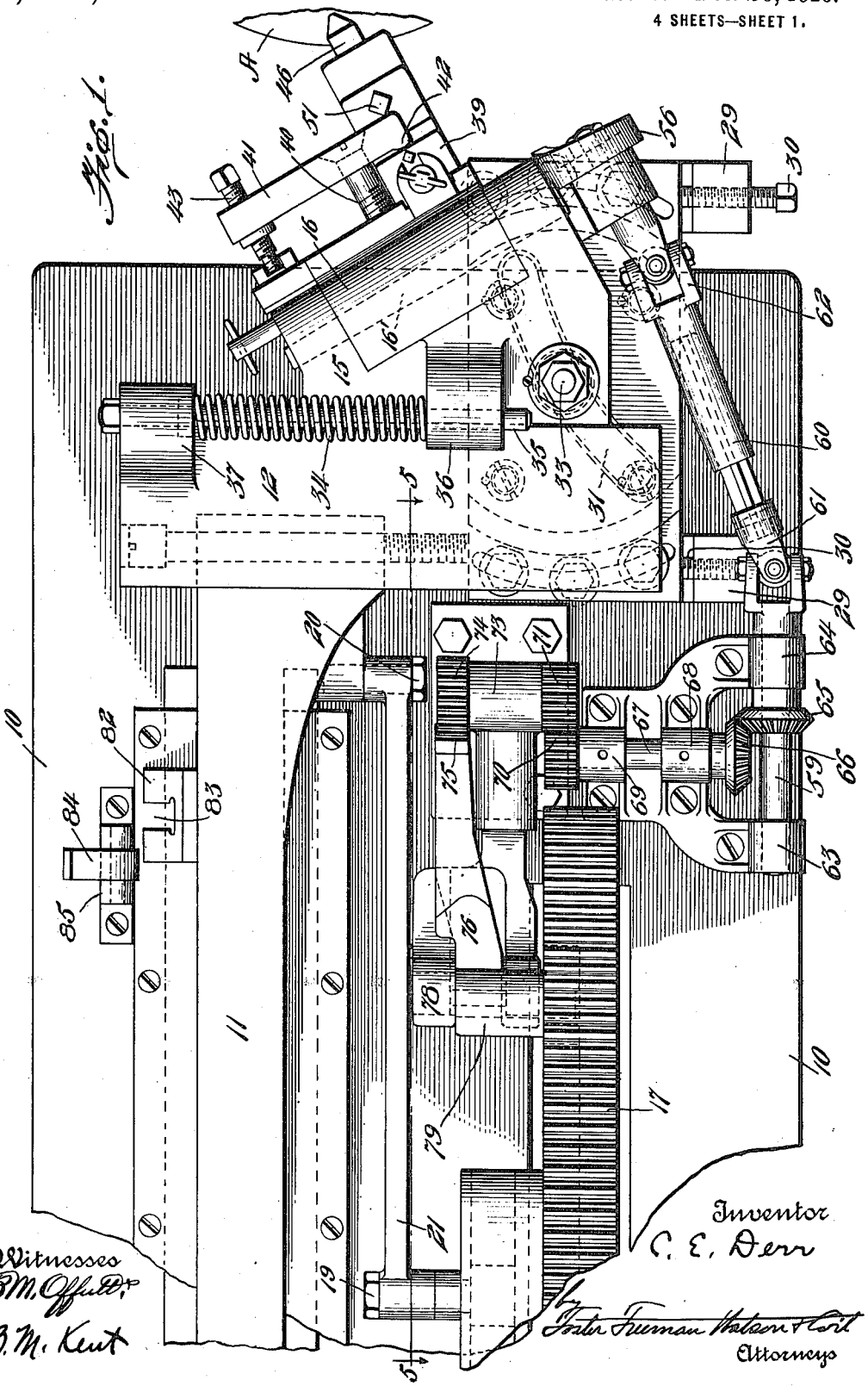

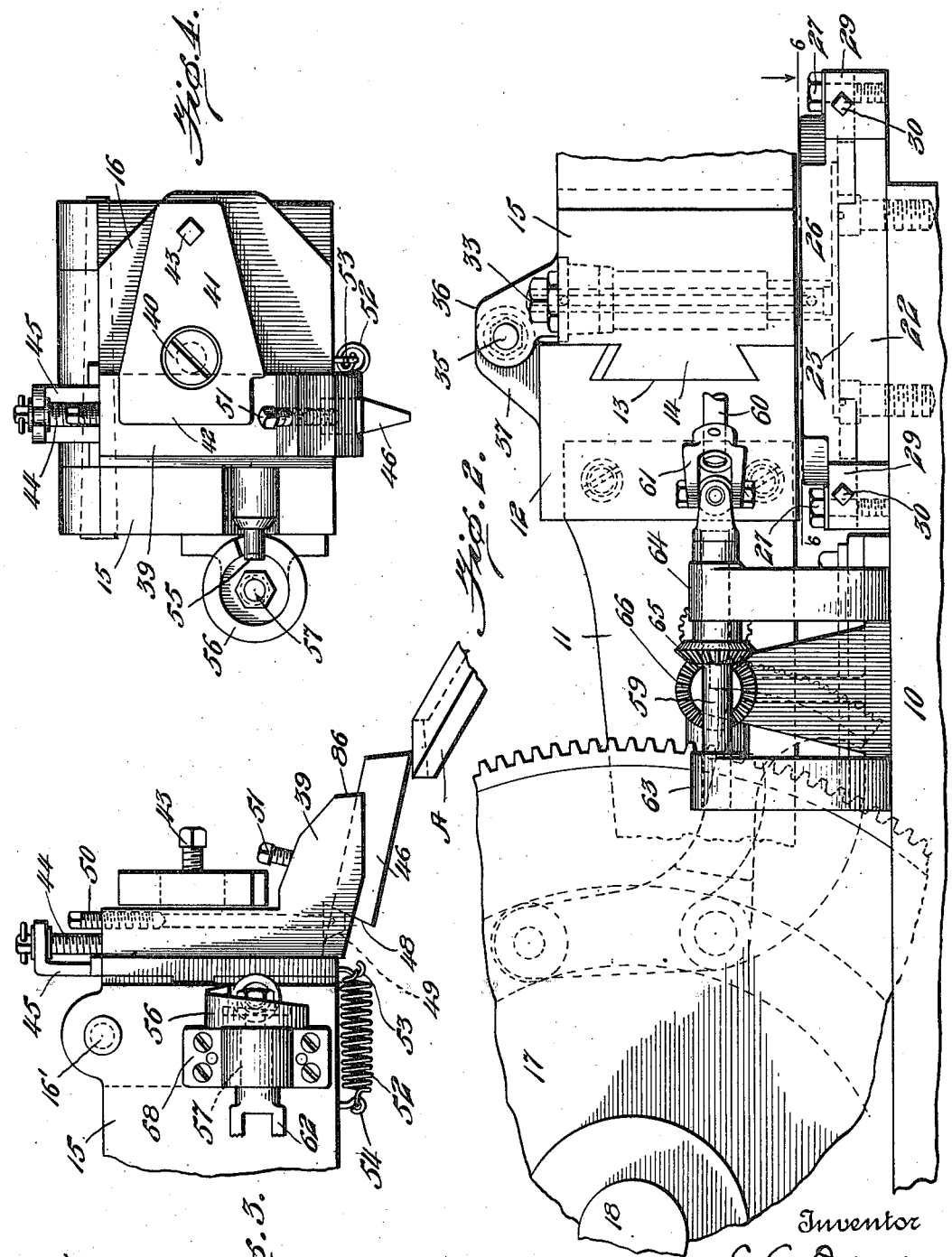

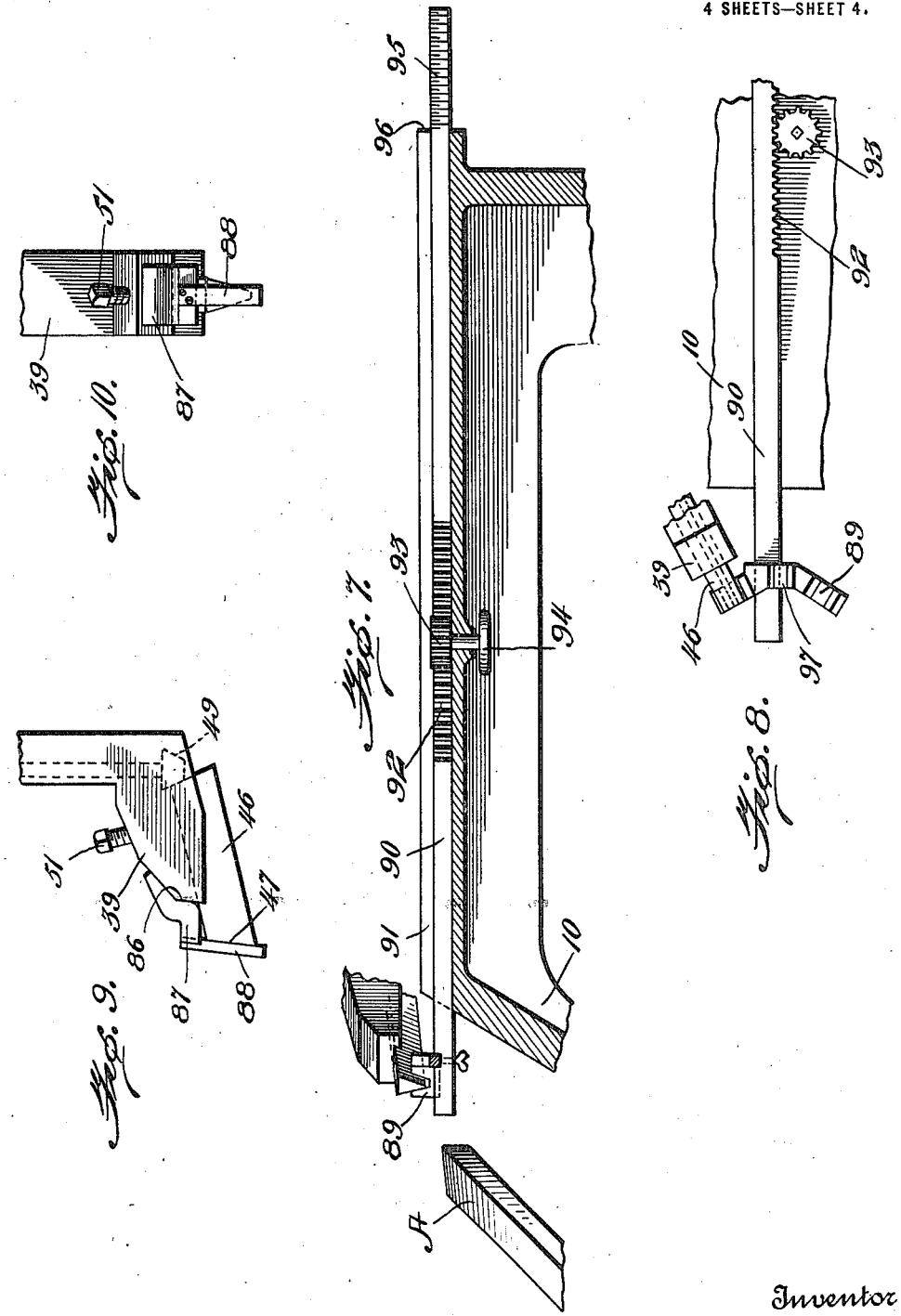

UNITED STATES PATENT OFFICE.

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

GEAR-CUTTING MACHINE.

1,209,682.   Specification of Letters Patent.   Patented Dec. 26, 1916.

Application filed February 11, 1913. Serial No. 747,677.

*To all whom it may concern:*

Be it known that I, CHARLES E. DERR, a citizen of the United States, and a resident of Detroit, Wayne county, Michigan, have invented certain new and useful Improvements in Gear-Cutting Machines, of which the following is a specification.

This invention relates to gear cutting machines and more particularly to improvements in the machine shown in my prior application Serial No. 725,328, filed October 11, 1912.

One of the objects of the invention is to provide a machine in which the tool carriage is moved transversely of the direction of movement of the ram and in which this transverse movement of the carriage is effected by means of a cam roller which is arranged beneath the carriage and coöperates with a suitably formed cam plate, the cam plate thus being concealed and protected.

Another object is to provide means for adjusting the cam plate in order to vary the lateral movement of the cutting tool.

A further object is to provide a construction in which the cam roller is yieldingly held against one side of the cam by a heavy spring so that there will be no pounding of the cam roller as the ram is reciprocated.

A further object is to provide a carriage having the tool carrying apron so pivoted in relation to the path of travel of the tool that the latter may be lifted from the blank without interference with the teeth which are being cut.

A further object is to provide improved means for lifting the tool carrying apron on the return stroke of the tool.

A further object is to provide improved means for minutely adjusting the position of the tool in the tool holder.

A further object is to provide an improved set of gages whereby the tool may be readily set in its proper position.

Other objects and the features of novelty will be apparent from the following description, taken in connection with the accompanying drawings, in which—

Figure 1 is a plan view of a portion of a gear cutting machine and showing my improvements. Fig. 2 is a side elevation of parts shown in Fig. 1. Fig. 3 is a side elevation of the tool holder and a portion of the tool carriage. Fig. 4 is a front elevation of the tool holder and carriage. Fig. 5 is a detail section substantially on the line 5—5 of Fig. 1; Fig. 6 is a section on the line 6—6 of Fig. 2. Fig. 7 is a longitudinal section through the machine, and showing in elevation one of my improved gages. Fig. 8 is a plan view of the parts shown in Fig. 7. Fig. 9 is a side elevation of the tool holder with another of the gages shown in position for setting the tool. Fig. 10 is a front elevation of the parts shown in Fig. 9.

Referring to the drawings, 10 indicates the frame of the machine on which is slidably mounted the ram 11 having secured thereto the head 12. The head 12 is provided with a suitable dove-tail slot 13 in its front face in which is arranged the dove-tail 14 of the tool carriage 15. The carriage 15 has pivoted thereto the tool supporting apron 16, the pivot 16' being arranged at an angle to the direction of movement of the ram 11 (see Fig. 1) and substantially at right angles to the direction of movement of the tool.

As in the case of my above mentioned prior application this machine is especially adapted for cutting bevel gears having spiral or curved teeth and the curvature of the teeth is formed by combining with the usual reciprocating movement of the ram and tool carriage, a transverse movement of the carriage. The ram and the tool carriage may be reciprocated in any suitable manner and for this purpose I have provided a gear wheel 17 mounted on a shaft 18 and driven from any suitable source of power. The wheel 17 carries an adjustably arranged crank pin 19 which is connected with a pin 20 on the ram 11 by means of connecting rod 21. The location of the crank pin 19 relative to the axis of the shaft 18 is adjustable for the purpose of varying the stroke of the ram 11.

In order to move the tool carriage laterally I secure to the frame 10, beneath the carriage, a plate 22 having a raised central portion 23 provided with the circular edges 24 and 25, this raised portion thus constituting a pivot for a plate 26 which is secured on the plate 22 by means of suitable bolts 27 passing through slots 28 in the plate 26.

The plate 26 as thus arranged constitutes a form of turn table. In order to hold the plate 26 in any desired position the plate 22 is provided with the lugs 29 through which pass the adjusting screws 30, these screws engaging one of the edges of the plate 26 so that by turning these screws in opposite directions it is possible to swing the plate 26 on the raised portion 23 of the plate 22. The plate 26 is provided with a suitably formed cam slot 31 in which moves the cam roller 32 carried by the pin or bolt 33 on the tool carriage 15.

From Figs. 1 and 6 it will be obvious that as the ram 11 is reciprocated the tool carriage will be moved laterally by the engagement of the roller 32 with the edges of the cam slot 31. In order to prevent back lash of the roller 32 in the slot 31 and maintain the roller in yieldable contact with one side of the slot I have provided a comparatively stiff spring 34 which is arranged on a bolt or pin 35 between the brackets 36 and 37. The bracket 36 is secured to the tool carriage 15 and the bracket 37 is secured to the head 12 of the ram 11. The bolt or pin 35 is preferably secured in the bracket 37 and slides freely through a suitable opening in the bracket 36 so that as the ram reciprocates the spring 34 will be alternately contracted and extended and will maintain the roller 32 in yieldable contact with the side 38 of the cam slot 31.

The tool apron 16 has arranged on its front face the tool holder 39, this holder being held in position by means of a clamping plate 41, which is fulcrumed on the screw 40 and has its side 42 forced into engagement with the tool holder, to secure the latter, by means of a screw 43. The tool holder 39 may be adjusted vertically by means of a screw 44 which is held in a bracket 45 on the apron 16. The tool holder is provided with a dove-tail slot in its lower side which receives the wedge shaped tool 46, the cutting edge 47 of which is arranged at the forward end of the tool. The rearward end 48 of the tool 46 is beveled and has arranged in engagement therewith a wedge 49 which may be adjusted vertically by means of a screw 50 for the purpose of moving the tool forwardly. The tool may be clamped in any desired position by means of a set screw 51. In order to yieldably retain the apron 16 in its operative position against the forward face of the tool carriage 15, I have provided on the under side of the carriage a spring 52, this spring being connected with suitable arms 53 and 54 on the apron and carriage, respectively.

In the operation of the machine the tool 46 makes a cut in the blank A on the forward stroke and in order to lift the tool out of the space between the teeth, on the return or rearward stroke, I provide on one side of the apron a pin or roller 55 which is adapted to be engaged by a cam 56 on a shaft 57. The shaft 57 is mounted in a suitable bearing 58 at the side of the carriage 15 and is connected with a shaft 59 by means of a telescopic shaft 60 and the universal joints 61 and 62. The shaft 59 is mounted in bearings 63, 64 on the frame 10 and carries a bevel gear 65 which meshes with a gear 66 on the shaft 67, the latter shaft being mounted in bearings 68 and 69, and also carrying a gear 70. The gear 70 meshes with a gear 71 on shaft 72, this shaft being mounted in a bearing 73 and also carrying a gear 74. The gear 74 meshes with a segmental gear 75 which is carried by one arm 76 of a bell-crank pivotally mounted at 77 on a suitable bracket 78. The other arm 79 of the bell crank carries a cam roller 80 arranged in a cam slot 81 in the side of the gear 17, this cam slot being so formed as to rock the bell crank on the pivot 77.

As will be readily understood the rocking of the bell crank effects a rotation of the gear 74 and the cam 56, the arrangement of the parts being such that the cam 56 is given slightly less than a complete revolution by this rocking movement. The cam 56 is so formed that the apron 16 will be swung on its pivot 16' sufficiently to raise the tool 46 out of the tooth space in the blank A. The cam slot 81 is so formed in relation to the position of the crank 19 as to raise the tool 46 at the end of the forward stroke of the tool and maintain the tool in elevated position until it reaches approximately the end of the rearward stroke, when the tool will be permitted to fall to its operative or cutting position. It will be observed that the shaft 57 is on the tool carriage and the telescopic shaft 60 and the universal joints 61 and 62 provide for the movement of this shaft relative to the fixed shaft 59.

In order to cut the teeth accurately in the blank A it is necessary that the forward edge of the tool be accurately set in a certain position because the tool must engage the blank at the proper point in its lateral movement otherwise the tooth space would be displaced laterally from the required position. For the purpose of accurately setting the tool I have provided on the ram 11 a bracket 82 having a slot 83 adapted to receive an arm or dog 84 which is pivotally mounted on a bracket 85 on the frame 10 (see Fig. 1). The arm 84 is normally in the position shown but when it is desired to set the tool, the ram is moved to a position where the slot 83 is in alinement with the arm 84; then the latter is thrown over into the slot thus locking the ram to the frame of the machine. This establishes a definite position for the forward face 86 of the tool holder in relation to the spindle on which the blank A is carried. In order to locate the forward face 47 of the tool in the proper position I have provided a gage 87 (see Fig. 9), this gage being adapted to engage the face 86 of the tool holder and having a downwardly projecting arm 88 adapted to engage the forward end 47 of the tool, the tool being moved into engagement with arm 88 by means of the wedge 49 and the adjusting screw 50. It will thus be obvious that by the use of the gage 87 the forward or cutting end of the tool 47 may always be accurately set so as to engage the blank A at the same point in the forward stroke of the tool. The tool may be set for blanks of different sizes by providing a different gage for each blank.

In addition to accurately determining the position of the forward end 47 of the tool, it will be seen that it is also essential to accurately determine the position of the tool laterally and for this purpose I provide a gage 89 having suitable slots for engaging the under side of the tool and which is preferably mounted on a rod 90 carried in a suitable recess 91 in the frame 10 of the machine, (see Figs. 7 and 8). The rod 90 is provided with the rack teeth 92 which are engaged by the actuating gear 93, this gear being rotated by means of a hand wheel 94. The rod 90 preferably extends to the rearward end of the machine and is provided with a suitable indicating scale 95 by means of which the longitudinal position of the rod 90 may be determined by the registration of the lines of the scale 95 with a suitable index, such as the rear edge 96 of the frame 10. From Fig. 8 it will be observed that the tool 46 may be set in a definite position laterally of the machine by means of the gage 89. This gage may be also provided with a slot 97 for setting the tool when it is desired to cut gears having straight teeth.

The machine as a whole operates as follows: The gear 17 being rotated effects the reciprocation of the ram 11 by means of the connecting rod 21. The carriage 15, which is carried by the ram, is moved back and forth transversely of the direction of movement of the ram by the coöperation of the cam slot 31 and the roller 32. The resultant movement given to the carriage and the tool 46 is a curved path similar to the slot 31 and the tool makes a curved cut in the blank A. The spring 34 constantly holds the roller 32 against the side 38 of the cam slot so that all lost motion in the mechanism is eliminated. Upon each back stroke of the ram the apron 16 is lifted to return the tool out of contact with the blank. This lifting of the apron is effected by the cam 56 which is actuated by the segmental gear 75, as hereinbefore described. At the completion of each return movement of the ram the apron 16 is lowered and the tool 46 is therefore in the operative position during the forward movement of the ram.

It will be understood that various changes may be made in the details of construction of the parts of the machine without departing from the spirit of the invention, as defined in the appended claims, and therefore I do not wish to be limited to the exact details which I have shown and described.

Having thus described the invention, what is claimed is:

1. In a gear cutting machine, the combination of a ram, means for reciprocating the ram, a tool carriage slidably mounted on the ram, means for causing transverse sliding action of the carriage as the ram is reciprocated, said means including a stationary member mounted directly beneath the tool carriage.

2. In a gear cutting machine, the combination of a ram, means for reciprocating the ram, a tool carriage slidably mounted on the ram, means for causing transverse sliding action of the carriage as the ram is reciprocated, said means including a stationary member mounted directly beneath the tool carriage, and a pin extending downwardly from said carriage and having a roller coöperating with said member.

3. In a gear cutting machine, the combination of a frame, a ram slidably arranged thereon, means for reciprocating the ram, a tool carriage slidably mounted on the ram, means for causing transverse sliding action of the carriage as the ram is reciprocated, said means including a cam member mounted on the frame beneath the carriage, and a pin extending downwardly from said carriage and having a roller coöperating with said cam member.

4. In a gear cutting machine, the combination of a frame, a ram slidably mounted thereon, means for reciprocating the ram, a tool carriage slidably mounted on the ram, a plate pivotally mounted on said frame and having a curved cam slot therein, a roller on said carriage arranged in said slot, and means for swinging said plate on its pivot.

5. In a gear cutting machine, the combination of a ram, means for reciprocating the ram, a tool carriage slidably mounted on the ram, cam means for moving the tool carriage transversely of the direction of movement of the ram to move the tool in a curved path, alined brackets on the ram and carriage, and a spring coacting with said brackets to yieldably hold said cam means in operative relation.

6. In a gear cutting machine, the combination of a ram, means reciprocating the ram, a tool carriage slidably mounted on the ram, a fixed plate having a cam slot therein, a roller on said carriage, alined brackets on the ram and carriage, a rod carried by said brackets, and a spring coiled on said rod and engaging said brackets for holding said roller in engagement with one side of said cam slot.

In testimony whereof I affix my signature in presence of two witnesses.

CHARLES E. DERR.

Witnesses:
CLAIR J. COTE,
LE ROI J. WILLIAMS.